United States Patent
Lutz et al.

(10) Patent No.: US 7,834,511 B2
(45) Date of Patent: Nov. 16, 2010

(54) CLAW POLE GENERATOR AND CLOSURE BODY FOR A CLAW POLE GENERATOR

(75) Inventors: Hans-Joachim Lutz, Lampertheim (DE); Oliver Gamm, Eislingen (DE); Horst Braun, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 270 days.

(21) Appl. No.: 11/997,013

(22) PCT Filed: Jul. 6, 2006

(86) PCT No.: PCT/EP2006/063954

§ 371 (c)(1),
(2), (4) Date: Jan. 28, 2008

(87) PCT Pub. No.: WO2007/020131

PCT Pub. Date: Feb. 22, 2007

(65) Prior Publication Data
US 2008/0211337 A1   Sep. 4, 2008

(30) Foreign Application Priority Data
Aug. 19, 2005 (DE) .................. 10 2005 039 282

(51) Int. Cl.
  H02K 1/22 (2006.01)
  H02K 21/12 (2006.01)
(52) U.S. Cl. .............. 310/263; 310/51; 310/156.66; 310/156.69; 310/156.71
(58) Field of Classification Search .............. 310/51, 310/156.66, 156.69, 156.71, 263; H02K 21/12, H02K 1/22
See application file for complete search history.

(56) References Cited

U.S. PATENT DOCUMENTS

| | | | | |
|---|---|---|---|---|
| 3,230,404 A | * | 1/1966 | Graham | 310/51 |
| 4,617,485 A | * | 10/1986 | Nakamura et al. | 310/65 |
| 5,483,116 A | * | 1/1996 | Kusase et al. | 310/263 |
| 5,519,277 A | * | 5/1996 | York et al. | 310/263 |
| 5,539,265 A | * | 7/1996 | Harris et al. | 310/263 |
| RE36,038 E | * | 1/1999 | Nakamura et al. | 310/65 |
| 6,144,138 A | | 11/2000 | Ragaly | |
| 6,225,727 B1 | * | 5/2001 | Oohashi et al. | 310/263 |
| 6,476,535 B1 | | 11/2002 | Oohashi et al. | |
| 6,720,703 B1 | * | 4/2004 | Braun et al. | 310/263 |
| 6,833,651 B2 | | 12/2004 | Pflueger | |
| 2002/0047485 A1 | * | 4/2002 | Okawa | 310/263 |

(Continued)

FOREIGN PATENT DOCUMENTS

DE           196 42 784           4/1998

(Continued)

*Primary Examiner*—Quyen Leung
*Assistant Examiner*—John K Kim
(74) *Attorney, Agent, or Firm*—Michael J. Striker

(57) ABSTRACT

The invention relates to a claw pole generator comprising a claw pole rotor, two magnet wheel halves (21, 23) which are mounted on a drive shaft (15) and are provided with claw-shaped magnet poles (22, 24) that mesh with each other, and an annular closing member (10) located between adjacent magnet poles (21, 23). The magnet wheel halves (21, 23) can be inserted into pockets (11) of the closing member (10) along with the magnet poles (22, 24) thereof such that the closing member (10) overlaps the magnet poles (22, 24) on the edge in at least some areas. Also disclosed is a closing member (10).

12 Claims, 4 Drawing Sheets

U.S. PATENT DOCUMENTS

Figure 1:
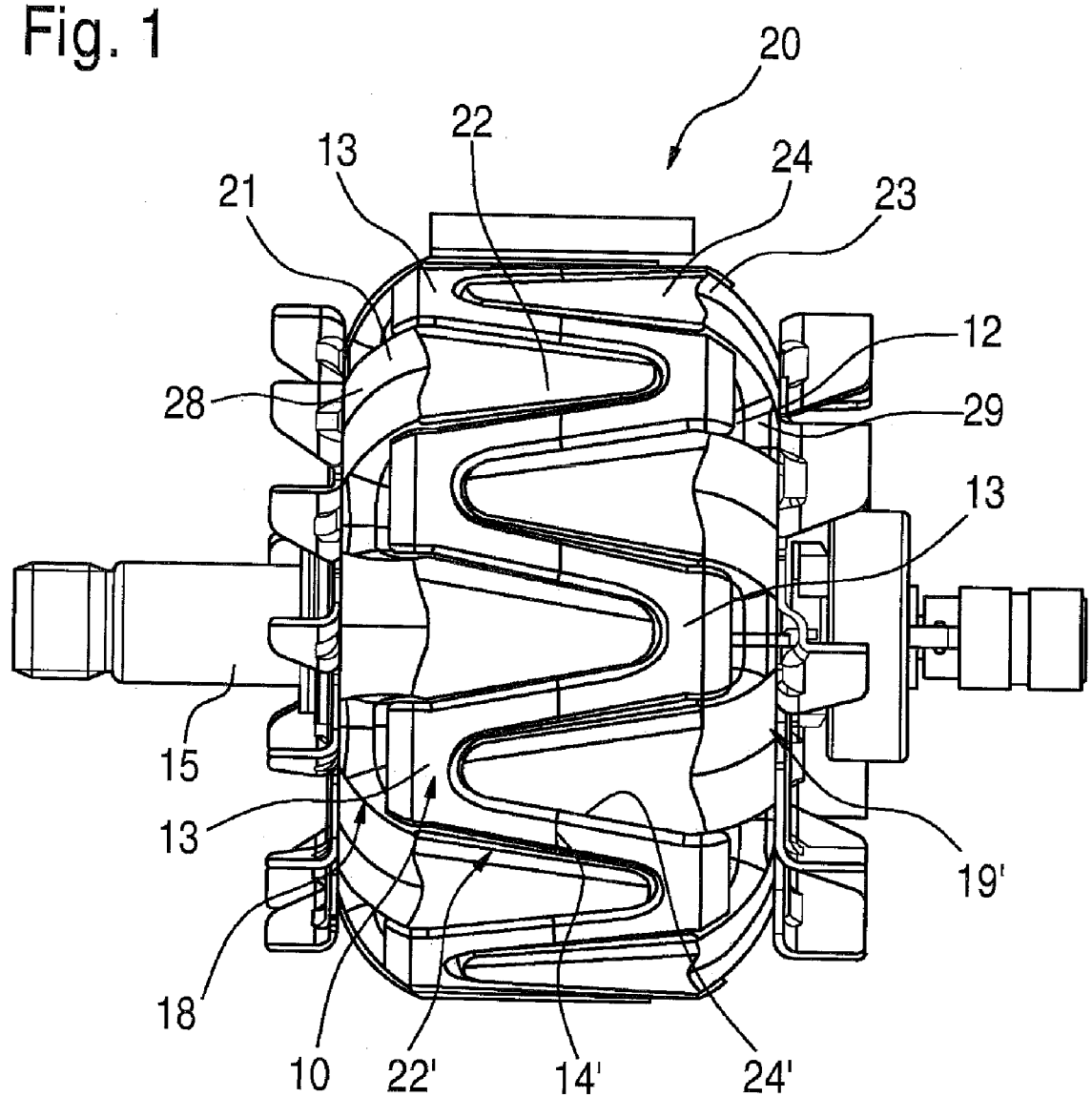

2008/0211337 A1 * 9/2008 Lutz et al. .............. 310/156.66

FOREIGN PATENT DOCUMENTS

| | | |
|---|---|---|
| DE | 199 58 503 | 7/2001 |
| DE | 101 55 223 | 5/2003 |
| EP | 0 720 275 | 7/1996 |
| WO | 2007/020131 | 2/2007 |

* cited by examiner

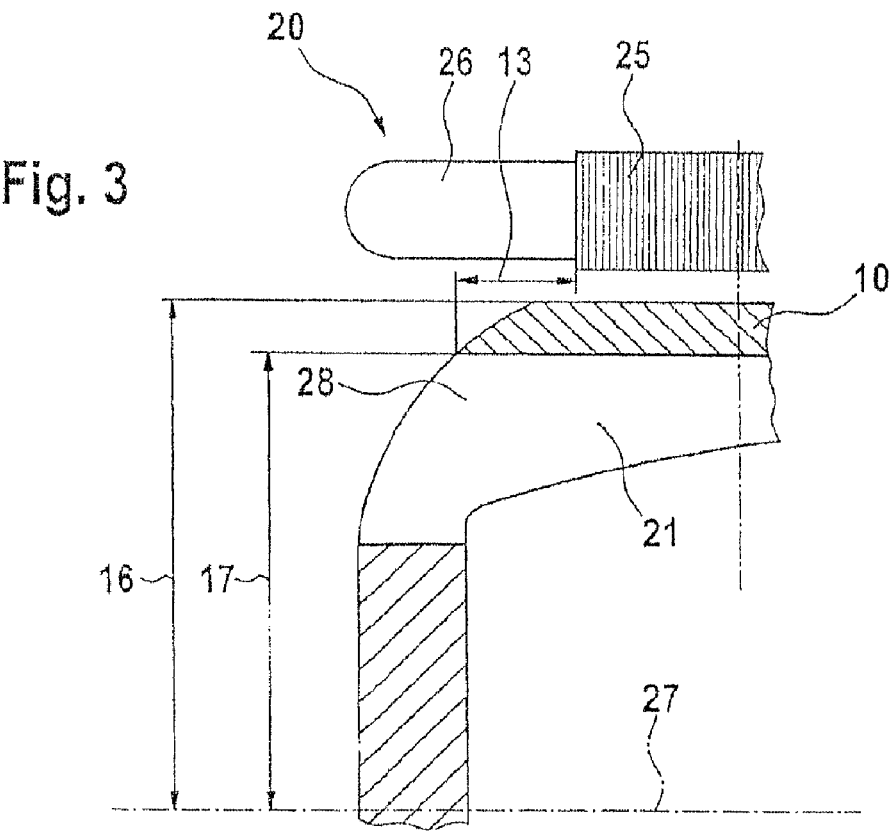
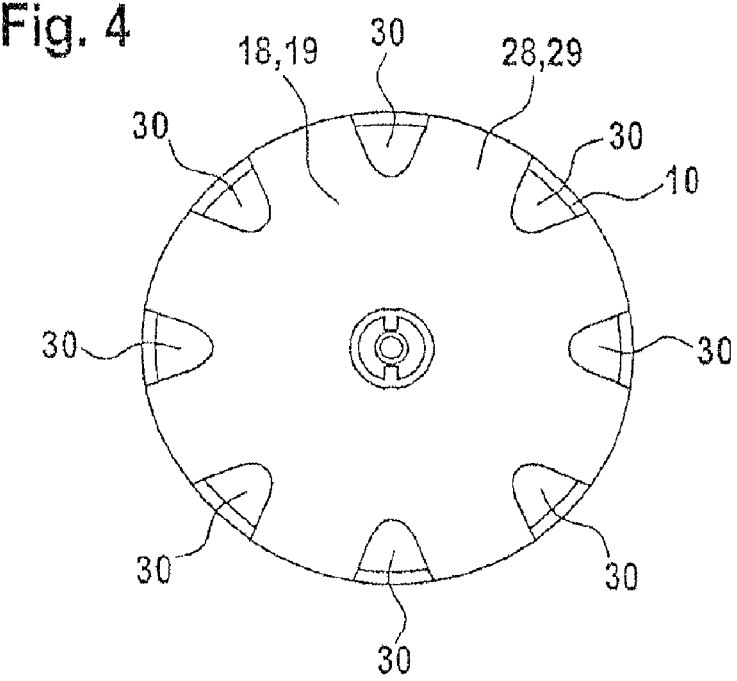

1

CLAW POLE GENERATOR AND CLOSURE BODY FOR A CLAW POLE GENERATOR

PRIOR ART

The invention is based on a claw pole generator as generically defined by the preamble to claim 1 and on a closure body for a claw pole generator as generically defined by the preamble to claim 11.

In claw pole generators, it is known that annoying interference noises can arise in the rotor and stator if the air volumes between the clawlike magnet poles are excited to vibration as a consequence of protrusions and indentations on the stator and winding head geometry. To overcome this problem, claw pole closures are used, which provide the smoothest possible outer circumferential surface of the claw pole rotor.

From German Patent Disclosure DE 196 42 784 A1 which defines this generic type, a claw pole generator is known that has two pole wheel halves, mounted on a drive shaft, that have clawlike magnet poles, and the magnet poles of the two pole wheel halves mesh with one another. An annular permanent-magnetic closure body is provided between adjacent magnet poles. Between the magnet poles, there are slots with undercuts, into which protrusions of the closure body can be inserted in form-locking fashion for radially fixing the closure body.

ADVANTAGES OF THE INVENTION

It is proposed that in a claw pole generator with a claw pole rotor, pole wheel halves with their magnet poles can be inserted into pockets of the closure body in such a way that the closure body at least in some regions wraps around the edges of the magnet poles. Compared to the prior art, manufacturing the elements is simplified, since undercuts, which are complicated in terms of tools, can be dispensed with. Assembly is simplified as well. The closure body is adapted to the contour of the rotor or its magnet poles in such a way that there are no protruding edges. The noise deadening of the claw pole generator is improved.

In a favorable feature, the closure body, between axially adjacent pockets, has a respective covering rib extending obliquely to a rotary axis; the covering rib covers the adjacent magnet poles on the outside on their lateral edges. As a result of this, it is possible for the magnet poles to be fixed securely in the pockets by form-locking engagement. A magnet pole can be thrust with its tips between the two lateral covering ribs and the pocket wall located behind the magnet pole.

In a further favorable feature, the pockets only partially cover the magnet poles on the inside. Preferably, only the tips of the magnet poles are inserted into the pockets. Thus the mass and moment of inertia of the rotor of the assembled closure body can advantageously be kept low.

If the closure body has an opening between respective adjacent covering ribs and the opening keeps a pole root of the respective magnet pole, extending between the adjacent covering ribs, free on the inside, considerable economies of weight can be achieved. As a result, cooling of the rotor can be improved. In manufacture, it also proves advantageous that the inflow of impregnating agent, such as impregnating resin, for fixing a typical exciter coil and for closing small gaps between the closure body and the magnet poles is simplified. This improves the noise deadening of the closure bodies still further. In a favorable feature, air gaps between the magnet poles and the closure body are therefore filled with a solid material, preferably impregnating resin. The closure body is preferably made from a nonmagnetic material, preferably aluminum, an aluminum alloy, a magnesium alloy, or plastic. No expensive permanent-magnetic materials are necessary.

In a favorable feature, a ratio of the inside radius of the closure body to the outside radius of the pole wheel half is at most 0.98. Preferably, the ratio is in the range between 0.95 and 0.85, and in particular between 0.94 and 0.87. This produces especially favorable noise deadening.

In a favorable feature, in the axial direction an overshoot is embodied above the pockets that is at least 10% longer than a stator iron, preferably at least 20% and especially preferably approximately 30% longer. As a result, the influence of noise interference that arises from the winding head and not only from the stator iron is reduced. The noise deadening is further improved.

The cooling can advantageously be ensured if at most 60% and especially preferably at most 50% of a projection area between the pole roots is covered by a fan.

Moreover, a closure body for closing gaps between adjacent magnet poles of two pole wheel halves of a claw pole generator is proposed which is embodied as a zigzag-like ring in which there is a pocket in the tip of each zigzag.

In a favorable feature, axially offset pockets are connected to covering ribs, extending obliquely to an axis of symmetry, which laterally cover the respective pocket. Secure guidance of magnet poles can be achieved.

In a favorable feature, on the inside of the covering rib there is a rib whose height is equivalent to a radial depth of the pockets. An improvement in mechanical stability is attained if the rib originates at both pockets joined by the respective covering rib. Favorably, a ratio between the width of the rib and the width of the covering rib is less than 0.5, and in particular is at most 0.4. Economies of both material and weight are attained.

Weight advantages can be attained if the pockets have a wall thickness of at most 2.5 mm, and in particular 2 mm.

Noise interference originating in a winding head of a stator iron can be avoided in operation if there is an overshoot axially above the pockets.

Preferably, the ring is nonmagnetic; aluminum, an aluminum alloy, a magnesium alloy, or plastic is preferred.

DRAWINGS

Further embodiments, aspects and advantages of the invention will become apparent, even independently of how they are summarized in claims, without restricting the general applicability, from the ensuing exemplary embodiment of the invention shown in the drawings.

Shown hereinafter are:

FIG. 1, a side view of a claw pole generator of the invention;

FIG. 2 *a-c*, (a) a closure body of the invention; (b) the closure body in section; (c) the closure body in plan view;

FIG. 3, a section with the closure body overshoot and the stator iron of a claw pole generator;

FIG. 4, a view of projection areas between pole roots; and

Figure 5:
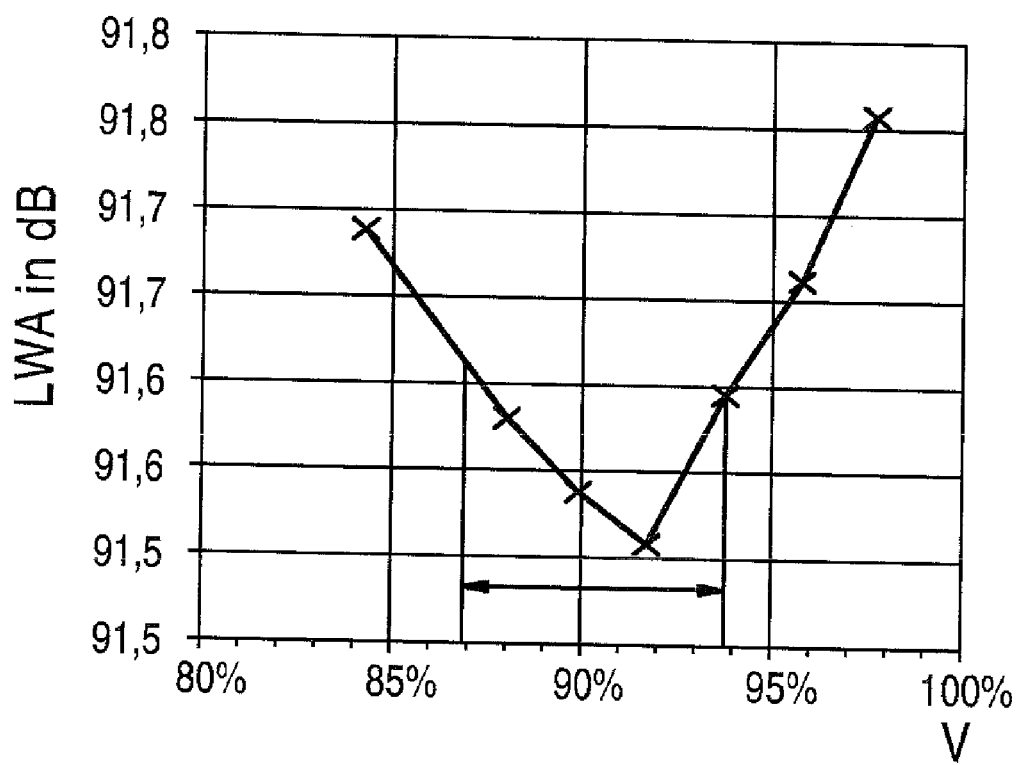

FIG. 5, measurement findings on the noise produced in a claw pole generator of the invention.

DESCRIPTION OF THE EXEMPLARY EMBODIMENT

FIG. 1 shows a side view of a claw pole generator 20 according to the invention, with two pole wheel halves 21, 23 that are mounted on a drive shaft 15 and have clawlike magnet poles 22, 24. The magnet poles 22, 24 of the two pole wheel halves 21, 23 mesh with one another. Between the magnet poles 22, 24, there is an annular closure body 10. The pole wheel halves 21, 23 together with the closure body 10 form a rotor of the claw pole generator 20. For the sake of simplicity, only some of the elements are shown as examples with reference numerals.

The magnet poles 22, 24 are inserted by their tips into the closure body 10, so that the closure body 10 wraps at least in some regions around the magnet poles 22, 24 there, while the respective pole roots 28, 29 are free. The magnet poles 22, 24 each originate at respective mounting plates 18 and 19 located axially one on either side.

The magnet poles 22, 24 are covered on their lateral edges 22' and 24', respectively, by a covering rib 14' of the closure body 10, so that they are securely held in the pockets 11. The magnet poles 22, 24 and the pockets 11 of the closure body 10 are located in overlapping fashion in the circumferential direction in the region of the tips of the magnet poles 22, 24. In the region of the pockets 11, the closure body 10 wraps around the edges of the tips of the magnet poles 22, 24 but leaves their outward-facing flat sides practically free.

FIG. 2 shows a closure body 10 of the invention in various views in detail. The closure body 10 serves to close gaps between adjacent magnet poles 22, 24 of two pole wheel halves 21, 23 of a claw pole generator 20 which are located on a drive shaft 15 and which have clawlike magnet poles 22, 24; the magnet poles 22, 24 of the two pole wheel halves 21, 23 mesh with one another, as has been described in conjunction with FIG. 1.

Figure 2A:
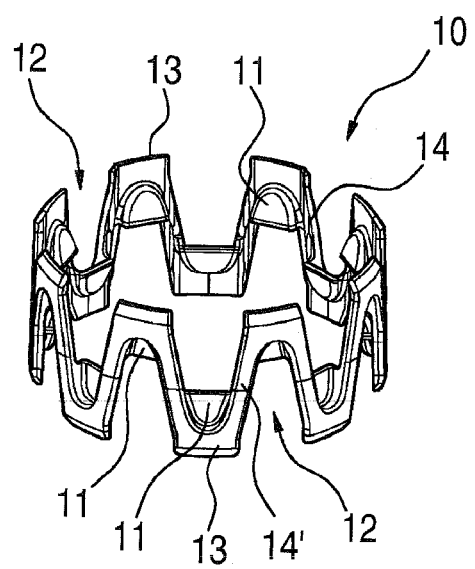

FIG. 2a shows the design of the closure body 10 as a zigzag-like ring, in which there is a pocket 11 located in each tip of the zigzags. An overshoot 13 extends axially above each of the individual pockets 11. The pole wheel halves 21, 23 can be thrust with their magnet poles 22, 24 into pockets 11, and the closure body 10 with its pockets 11 engages the magnet poles 22, 24 from behind. The closure body 10 is formed from a nonmagnetic material.

Extending between axially offset, adjacent pockets 11 is a covering rib 14', which laterally covers the respective pocket 11 and extends obliquely to a rotary axis 27. In the assembled state, the covering rib 14' covers adjacent magnet poles 22, 24 on the outside, on their lateral edges 22', 24', as can be seen in FIG. 1. As a result, in this region the closure body 10 surrounds the magnet poles 22, 24 on both the inside and the edges.

The pockets 11 cover the magnet poles 22, 24 only at their tips, while in the region of the pole roots 28, 29, openings 12 are provided (see FIG. 1). The pockets 11 have a wall thickness of at most 2.5 mm, and in particular 2 mm.

Figure 2B:
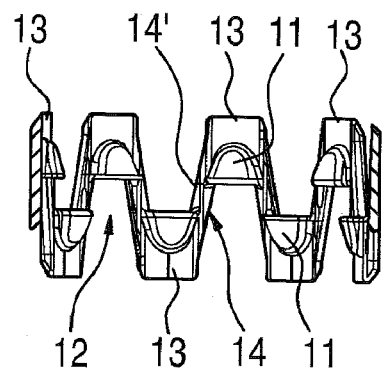

FIG. 2b shows a closure body 10, cut open. It can be seen that on the inside of the covering rib 14' there is a rib 14, whose height is approximately equivalent to a radial depth of the pockets 11. The rib 14 begins at both pockets 11 that are joined by the respective covering rib 14' and increases the mechanical stability of the closure body 10.

A ratio between the width of the rib 14 and the width of the covering rib 14' is preferably less than 0.5, and in particular is at most 0.4.

Figure 2C:
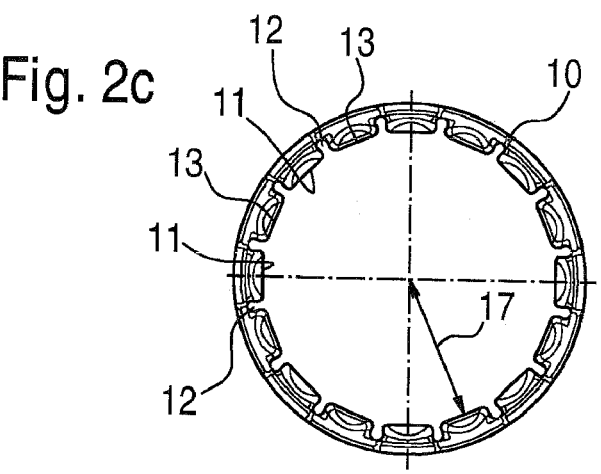

FIG. 2c shows a plan view on a closure body of the invention, with inward-pointing pockets 11, for further explanation of the invention. The closure body 11 has an inside radius 17 that is less than an outside radius 16 of the pole wheel half 21, 23, as shown in FIG. 3, which is a section through a claw pole generator 20. Since the contour of the closure body 10 is adapted to that of the respective magnet pole 21, 23, the result, depending on the inside diameter of the closure body 10, is a variable length.

The closure body 10 has an overshoot 13, which is at least 10% longer than a stator iron of a stator 25 of the claw pole machine 20, so that the overshoot 13 extends in an interstice between a winding head 26 of the stator 25 and a pole root 28 of a magnet pole 21. The overshoot 13 is preferably at least 20% longer than a stator iron 25, and in particular is approximately 30% longer.

A preferred ratio of the inside radius 17 of the closure body 10 to the outside radius 16 of the rotor is at most 0.98 and is preferably between 0.95 and 0.85, and especially preferably between 0.94 and 0.87.

The opening 12 kept free by the closure body 10 between the pole roots 28 and 29 is blocked at least partially by fans, not shown, that are typically mounted on both face ends. The cooling is improved if a suitably selected maximum face-end blockage by the fans is not exceeded.

The heat transfer coefficient and hence the cooling action are greatest at the surface of the pole roots 28 and 29. This is especially true for the leading ends of the respective pole roots 28 and 29. Preferably, at most 60% and especially preferably at most 50% of a projection area between the pole roots 28 and 29 is covered by the fan. The projection area is explained in FIG. 4. In a plan view on the mounting plates 18 or 19 of the respective pole wheel half 21, 23, a circular face is seen, in which the pole roots 28 and 29 form the edge of the circular face and are each separated by projection regions 30. The individual projection regions 30 between the pole roots 28 or 29, taken together, form the projection area.

FIG. 5 shows measurement findings for a claw pole generator according to the invention, in which a noise signal LWA is plotted over the ratio V of the inside radius 17 of the closure body 10 to the outside radius 16 of the rotor. It can be seen clearly that the characteristic curve has a pronounce minimum in the range between 0.98 and 0.84. At a ratio V, the signal LWA is minimal, at approximately 91.5 dB, compared to approximately 91.8 dB at V=0.98.

The invention claimed is:

1. A claw pole generator, comprising:
   two pole wheel halves (21, 23) mounted on a drive shaft (15) and including clawlike magnet poles (22, 24) configured to mesh with one another, and
   an annular closure body (10) arranged between adjacent magnet poles (21, 23),
   characterized in that the pole wheel halves (21, 23) with their magnet poles (22, 24) are insertable into axially offset pockets (11) of the closure body (10) in such a way that the closure body (10) wraps around edges of the magnet poles (22, 24), at least in some regions,
   wherein said axially offset pockets (11) are connected to covering ribs (14'), which covering ribs (14') extend obliquely to an axis of symmetry (27) and laterally cover respective axially offset pockets (11), including a rib (14) located on an inside of a covering rib (14'), originating at both pockets (11), connected by the respective covering rib (14') and having a height that is approximately equivalent to a radial depth of the pockets (11).

2. The claw pole generator as defined by claim 1, characterized in that the closure body (10) has one covering rib (14') each, extending obliquely to a rotary axis (27), between axially adjacent pockets (11) and covers adjacent magnet poles (22, 24) on the outside on their lateral edges (22', 24').

3. The claw pole generator as defined by claim 1, characterized in that the pockets (11) only partially cover the magnet poles (22, 24) on the inside.

4. The claw pole generator as defined by claim 1, characterized in that between adjacent covering ribs (14'), the closure body (11) has an opening (12) which keeps a pole root (28, 29) of the respective magnet pole (22, 24), extending between the adjacent covering ribs (14'), free on the inside.

5. The claw pole generator as defined by claim 1 characterized in that a ratio (V) of the inside radius (17) of the closure body (10) to the outside radius (16) of the pole wheel half (21, 23) is at most 0.98.

6. The claw pole generator as defined by claim 5, characterized in that the ratio is in the range between 0.95 and 0.85, and in particular between 0.94 and 0.87.

7. The claw pole generator as defined by claim 1, characterized in that in the axial direction an overshoot (13) is embodied above the pockets (11) extending from an end of the stator core (25) and end of closure body (10), which overshoot is at least 10% longer than a stator iron (25), and in particular is approximately 30% longer.

8. The claw pole generator as defined by claim 1, characterized in that air gaps between the magnet poles (22, 24) and the closure body (10) are filled with a solid material.

9. The claw pole generator as defined by claim 1, characterized in that at most 60% of a projection area between the pole roots (28, 29) is covered by a fan.

10. The claw pole generator as defined by claim 1, wherein the closure body is configured for closing gaps between adjacent magnet poles (22, 24) in a shape of zigzag-like ring, each a pocket (11) located in a tip of each zigzag.

11. The claw pole generator as defined by claim 1, characterized in that a ratio between the width of the rib (14) and the width of the covering rib (14') is less than 0.5, and in particular is at most 0.4.

12. The claw pole generator as defined by claim 1, characterized in that the pockets (11) have a wall thickness of at most 2.5 mm, and in particular 2 mm.

* * * * *